United States Patent
Jiang (10) Patent No.: US 10,387,164 B2
(45) Date of Patent: Aug. 20, 2019

(54) METHOD FOR INITIALIZING PERIPHERAL COMPONENT INTERCONNECT EXPRESS INTERFACE CARD

(71) Applicant: MITAC COMPUTING TECHNOLOGY CORPORATION, Taoyuan (TW)

(72) Inventor: Yan-Ting Jiang, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 15/869,902

(22) Filed: Jan. 12, 2018

(65) Prior Publication Data

US 2018/0329716 A1  Nov. 15, 2018

(30) Foreign Application Priority Data

May 12, 2017 (TW) .............................. 106115881 A (51) Int. Cl.
| | |
|---|---|
| *G06F 9/4401* | (2018.01) |
| *G06F 13/40* | (2006.01) |
| *G06F 13/42* | (2006.01) |

(52) U.S. Cl.
CPC .......... *G06F 9/4405* (2013.01); *G06F 9/4411* (2013.01); *G06F 13/4081* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 2005/0147117 A1 | 7/2005 | Pettey et al. | |
|---|---|---|---|
| 2008/0301422 A1* | 12/2008 | Johnson | G06F 11/2284 713/1 |
| 2014/0095853 A1* | 4/2014 | Sarangshar | G06F 9/4401 713/1 |

(Continued)

FOREIGN PATENT DOCUMENTS

| TW | 201232276 A | 8/2012 |
|---|---|---|
| TW | 200801952 A | 1/2018 |

OTHER PUBLICATIONS

Office Action issued in corresponding Taiwan patent application dated Apr. 27, 2018.

*Primary Examiner* — Hyun Nam
(74) *Attorney, Agent, or Firm* — Rabin & Berdo, P.C.

(57) ABSTRACT

A method for initializing a peripheral component interconnect express (PCI-E) interface card is provided. The method includes: initializing, by a processing unit in a boot procedure according to a preset first value of a flag, a PCI-E interface card inserted in a PCI-E interface slot by using a first initialization parameter included in a basic input/output system (BIOS) code; setting, by the processing unit in the boot procedure according to the initialized PCI-E interface card, the flag to have the first value or a second value; determining, by the processing unit in the boot procedure, whether the initialized PCI-E interface card needs to be reinitialized; and reinitializing, by the processing unit according to the second value of the set flag when the PCI-E interface card needs to be reinitialized, the PCI-E interface card by using a second initialization parameter included in the BIOS code.

18 Claims, 4 Drawing Sheets

(56) References Cited

U.S. PATENT DOCUMENTS

2014/0122833 A1* 5/2014 Davis ................ G06F 15/7803
  712/29
2014/0156986 A1 6/2014 Sun

* cited by examiner

METHOD FOR INITIALIZING PERIPHERAL COMPONENT INTERCONNECT EXPRESS INTERFACE CARD

CROSS-REFERENCE TO RELATED APPLICATION

This non-provisional application claims priority under 35 U.S.C. § 119(a) to Patent Application No. 106115881 filed in Taiwan, R.O.C. on May 12, 2017, the entire contents of which are hereby incorporated by reference.

BACKGROUND

Technical Field

The present invention relates to a method for initializing a peripheral component interconnect express (PCI-E) interface card.

Related Art

A PCI-E interface is one of computer bus interfaces, continues to use the concept and communication standard of earlier PCI interfaces, but has a higher transmission speed. For example, the transmission speed of the first-generation PCI-E interface is 2.5 GT/s, the transmission speed of the second-generation PCI-E interface is 5 GT/s, but the transmission speed of the third-generation PCI-E interface that is considerably popular nowadays is up to 8 GT/s.

However, as the transmission speed of the PCI-E interface is increased, loss of a PCI-E signal transmitted by the PCI-E interface becomes more serious. The cabling length is usually limited to reduce the loss of the PCI-E signal, but layout of a PCI-E interface card on a main board will be limited because the cabling length is limited. In addition, another method to reduce the loss of the PCI-E signal is to improve the material of a circuit board of the PCI-E interface card or to improve the material of a PCI-E interface slot connector. However, the production costs of the PCI-E interface card and the PCI-E interface slot connector increase when the better material is used. Therefore, to avoid limiting the layout of the PCI-E interface card on main board and the increase of production costs, the prior art also provides a solution that an initialization parameter of the PCI-E interface card could be adjusted and the adjusted initialization parameter is used to replace an unadjusted initialization parameter so as to mitigate the problem of signal loss. However, the initialization parameter can only be adjusted in a manual manner, that is, the initialization parameter is adjusted under control of an engineer who determines that the adjustment needs to be made. This is very inconvenient. In addition, the PCI-E interface card may be applied to different signal transmission environments. Even if the initialization parameter is adjusted, the adjustment is made only for a specific transmission environment, and one group of generated adjusted initialization parameters cannot be applicable to other transmission environments. Using an initialization parameter that does not meet a transmission environment cannot mitigate the problem of signal loss, and an error may still occur during signal transmission of the PCI-E interface card when the problem is serious.

SUMMARY

In view of this, the present invention provides a method for initializing a PCI-E interface card.

In an embodiment, a method for initializing a PCI-E interface card is applied to a computer, and includes: initializing, by a processing unit in a boot procedure according to a preset first value of a flag, a PCI-E interface card inserted in a PCI-E interface slot by using a first initialization parameter included in a basic input/output system (BIOS) code; setting, by the processing unit in the boot procedure according to the initialized PCI-E interface card, the flag to have the first value or a second value; determining, by the processing unit in the boot procedure, whether the initialized PCI-E interface card needs to be reinitialized; and reinitializing, by the processing unit according to the second value of the set flag when the PCI-E interface card needs to be reinitialized, the PCI-E interface card by using a second initialization parameter included in the BIOS code.

In conclusion, according to an embodiment of the method for initializing a PCI-E interface card of the present invention, a processing unit may select, in a boot procedure according to a flag, an initialization parameter that meets a PCI-E signal transmission environment to initialize the PCI-E interface card. When the processing unit selects an initialization parameter that does not meet the PCI-E signal transmission environment, the processing unit resets the flag and reinitializes the PCI-E interface card. Therefore, regardless of being in a good or poor PCI-E signal transmission environment, the amount of attenuation of a signal transmitted by the PCI-E interface card is less than a preset attenuation value, and production costs of an apparatus do not increase because a firmware is used for control.

DETAILED DESCRIPTION

Figure 1:
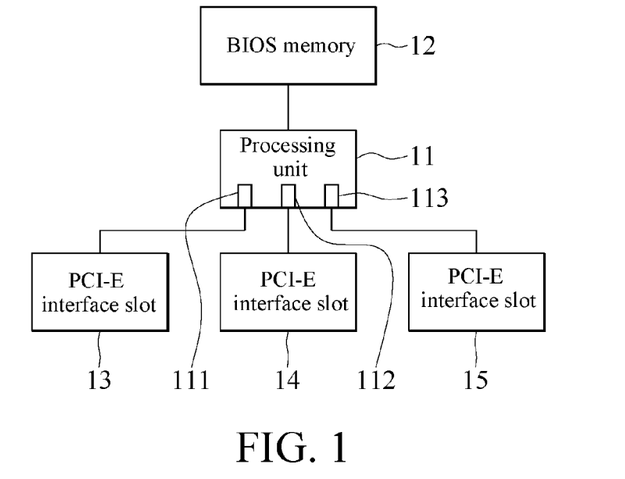
FIG. 1 is a schematic block diagram of an embodiment of an electronic apparatus having a PCI-E interface according to the present invention.
Figure 2:
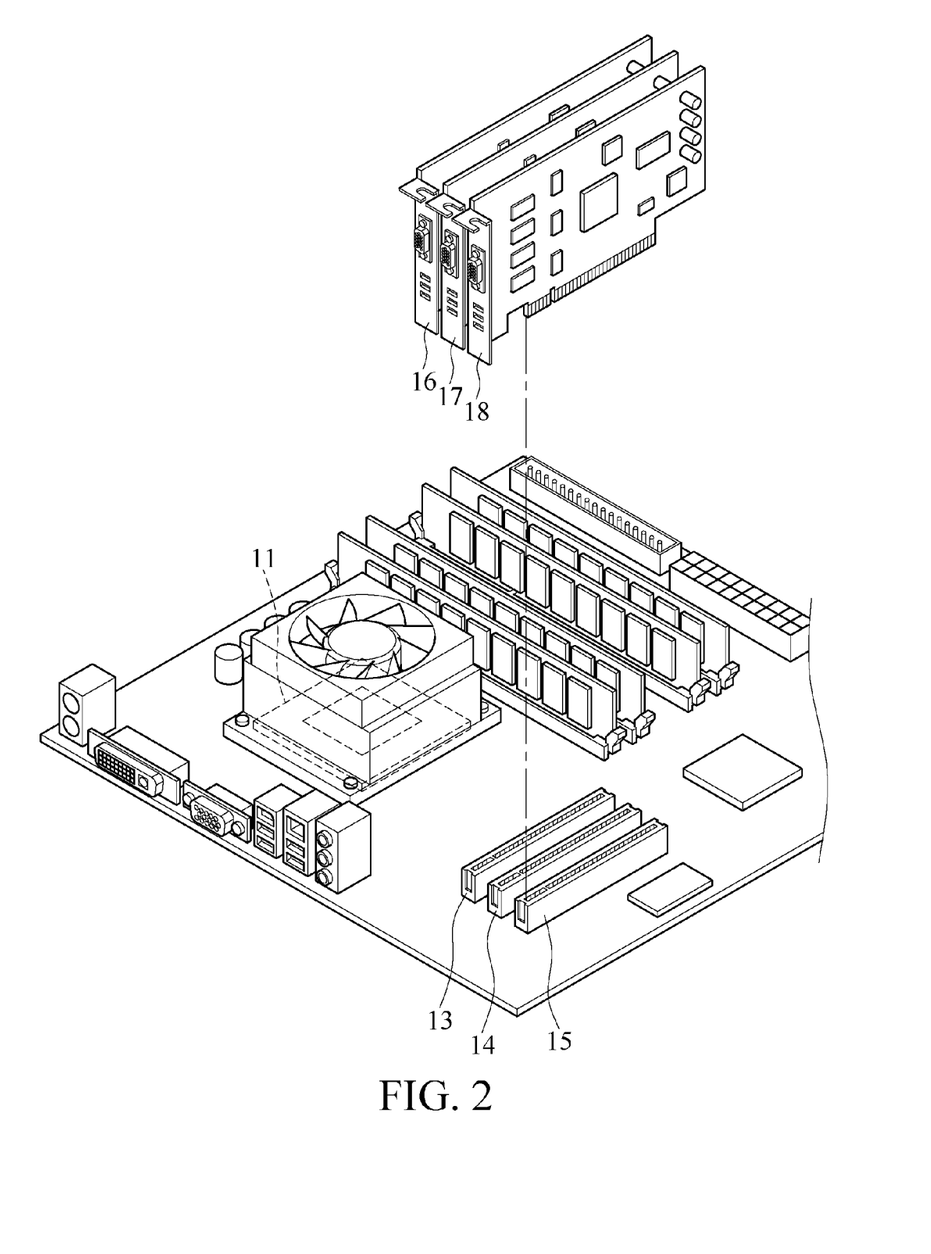
FIG. 2 is a schematic diagram of an implementation of the electronic apparatus having the PCI-E interface in FIG. 1.
Figure 3:
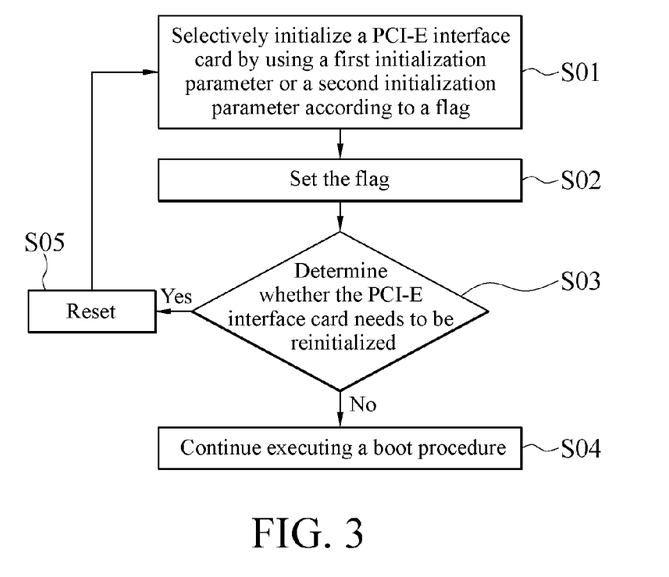
FIG. 3 is a flowchart of an embodiment of a method for initializing a PCI-E interface card according to the present invention.

FIG. 1 is a schematic block diagram of an embodiment of an electronic apparatus having a PCI-E interface according to the present invention. FIG. 2 is a schematic diagram of an implementation of the electronic apparatus having the PCI-E interface in FIG. 1. FIG. 3 is a flowchart of an embodiment of a method for initializing a PCI-E interface card according to the present invention. Referring to both FIG. 1 and FIG. 2, the electronic apparatus having the PCI-E interface includes a processing unit 11, a BIOS memory 12, and PCI-E interface slots 13, 14, and 15. The processing unit 11 is connected to the BIOS memory 12 and the PCI-E interface slots 13, 14, and 15. Herein, FIG. 1 is shown by using an example in which the quantity of the PCI-E interface slots is 3, but the present invention is not limited thereto. The quantity of the PCI-E interface slots may be increased or reduced according to demands of actual applications. In an embodiment, the processing unit 11 may be a central processing unit (CPU).

As shown in FIG. 2, the PCI-E interface slots 13, 14, and 15 are respectively used to insert PCI-E interface cards 16, 17, and 18. The PCI-E interface cards 16, 17, and 18 may be display cards, sound cards, network cards, or the like. The processing unit 11 includes at least three input/output (I/O) pins 111, 112, and 113. The three I/O pins 111, 112, and 113 are respectively connected to the three PCI-E interface slots 13, 14, and 15. The processing unit 11 may send signals to the PCI-E interface cards 16, 17, and 18 by using the I/O pins 111, 112, and 113 respectively through the PCI-E interface slots 13, 14, and 15, or receive signals from the PCI-E interface cards 16, 17, and 18 by using the I/O pins 111, 112, and 113 respectively through the PCI-E interface slots 13, 14, and 15.

A BIOS code is stored in the BIOS memory 12. The BIOS code includes initialization parameters corresponding to each of the PCI-E interface cards 16, 17, and 18. Each of the initialization parameters may include a continuous time linear equalization (CTLE) value, a preset value, a pre-cursor value, a post-cursor value, or a combination thereof. When executing a boot procedure by executing the BIOS code, the processing unit 11 may initialize each of the PCI-E interface cards 16, 17, and 18 by using the initialization parameters in the BIOS memory 12. In addition, according to a PCI-E signal transmission environment provided by the electronic apparatus having the PCI-E interface, for example, various software and hardware parameters of the electronic apparatus which affecting the PCI-E signal transmission environment, the initialization parameters include at least one first initialization parameter and at least one second initialization parameter related to the software and hardware parameters. For example, the first initialization parameter and the second initialization parameter are initialization parameters that are needed when the PCI-E interface card 16 is initialized. The first initialization parameter may be an initialization parameter that is needed when the PCI-E interface card 16 is in a good PCI-E signal transmission environment, and the second initialization parameter may be an initialization parameter that is needed when the PCI-E interface card 16 is in a poor PCI-E signal transmission environment. On such basis, a designer of the electronic apparatus having the PCI-E interface may perform, before the apparatus is powered on, a test according to a PCI-E signal transmission environment provided by the apparatus, to respectively generate the first initialization parameter and the second initialization parameter according to the good and poor PCI-E signal transmission environments, and the first initialization parameter and the second initialization parameter can be prestored in the BIOS memory 12 as a part of the BIOS code.

A flag (that is, the flag is a part of the BIOS code) is also stored in the BIOS memory 12. The flag is preset to have a first value or a second value. When the processing unit 11 executes the BIOS code, referring to FIG. 1 to FIG. 3, the processing unit 11 may initialize, in a boot procedure according to the preset first value or second value of the flag, the PCI-E interface card by selectively using the first initialization parameter or the second initialization parameter (step S01). For example, the first value of the flag corresponds to the first initialization parameter, and the second value of the flag corresponds to the second initialization parameter. In step S01, the processing unit 11 may initialize the PCI-E interface card 16 by using the first initialization parameter according to the first value of the flag, or initialize the PCI-E interface card 16 by using the second initialization parameter according to the second value of the flag. Next, the processing unit 11 sets the flag (step S02) according to the initialized PCI-E interface card 16, so that the corresponding first value or second value of the flag may change according to different PCI-E interface cards inserted in the PCI-E interface slots 13, 14, and 15. In an embodiment, a binary representation method is used as an example, and the first value and the second value of the flag may be '0' and '1' respectively. In other words, the processing unit 11 may set the flag to '0' or '1'.

After setting the flag, the processing unit 11 determines whether the initialized PCI-E interface card 16 needs to be reinitialized (step S03). When the processing unit 11 determines that the PCI-E interface card 16 needs to be reinitialized (a determining result is 'Yes'), it indicates that the PCI-E interface card 16 is initialized by an initialization parameter that does not meet a PCI-E signal transmission environment in step S01. Consequently, the amount of attenuation of a PCI-E signal transmitted by the PCI-E interface card 16 is greater than or equal to a preset attenuation value. Therefore, the processing unit 11 is reset (step S05). The processing unit 11 starts to perform step S01 after being reset. The processing unit 11 reinitializes the PCI-E interface card 16 according to the flag that is set before the processing unit is reset, so that the PCI-E interface card 16 is compatible with the various software and hardware parameters of the apparatus after the PCI-E interface card 16 is reinitialized, and the amount of attenuation of a PCI-E signal transmitted by the PCI-E interface card 16 is less than the preset attenuation value. On the other hand, when the processing unit 11 determines that the PCI-E interface card 16 does not need to be reinitialized (the determining result is 'No'), it indicates that the PCI-E interface card 16 is initialized by an initialization parameter that meets the PCI-E signal transmission environment in step S01. In this case, the processing unit 11 may continue executing the boot procedure (step S04). Alternatively, the processing unit 11 may start performing step S01 again, to initialize the other PCI-E interface cards 17 and 18 according to the flag, and selectively reinitialize the PCI-E interface cards 17 and 18 according to the foregoing process, so that the amount of attenuation of a PCI-E signal transmitted by the PCI-E interface card 17 or 18 is also less than the preset attenuation value. When the PCI-E interface cards 17 and 18 both do not need to be reinitialized, the processing unit 11 continues executing the boot procedure (step S04).

In an embodiment, the PCI-E interface card 16 is also used as an example with the first value of the flag corresponding to the first initialization parameter and the second value of the flag corresponding to the second initialization parameter. In step S01, the processing unit 11 may initialize, according to the flag that is preset to have the first value, the PCI-E interface card 16 by using the first initialization parameter that meets the good PCI-E signal transmission environment, and set, in step S02 according to the initialized PCI-E interface card 16, the flag to have the second value, so that the flag changes from the preset first value to the second value after the flag is set. Next, the processing unit 11 determines, in step S03, that the PCI-E interface card 16 needs to be reinitialized as a result of the PCI-E interface card 16 is initialized in step S01 by the first initialization parameter that does not meet an actual PCI-E signal transmission environment. Therefore, the processing unit 11 reinitializes, in step S01 according to the second value of the set flag, the PCI-E interface card 16 by using the second initialization parameter that meets the poor PCI-E signal transmission environment after the processing unit is reset; after the PCI-E interface card 16 is reinitialized by the second initialization parameter, the processing unit 11 determines, when the processing unit is reset to perform step S03 again, that the PCI-E interface card 16 does not need to be reinitialized; and continues executing the boot procedure (step S04).

Figure 4:
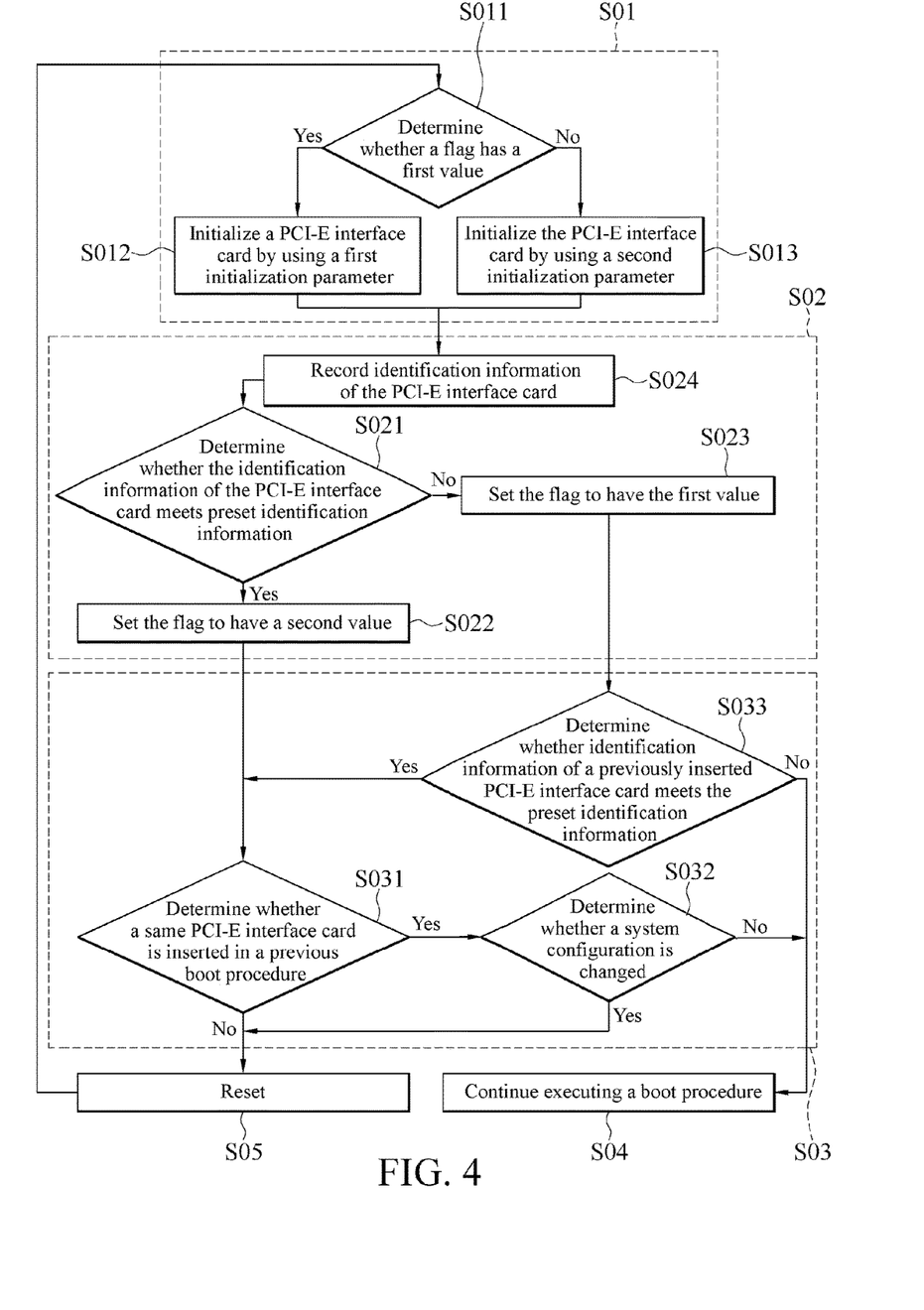
FIG. 4 is a flowchart of an implementation of the method for initializing a PCI-E interface card in FIG. 3.

FIG. 4 is a flowchart of an implementation of the method for initializing a PCI-E interface card in FIG. 3. Referring to FIG. 1 to FIG. 4, the PCI-E interface card 16 is also used as an example. In step S01, the processing unit 11 determines a value of the flag, to determine that the PCI-E interface card 16 needs to be initialized by using the first initialization parameter or the second initialization parameter. For example, the processing unit 11 may determine whether the flag has the first value (step S011). When the processing unit 11 determines that the flag has the first value (a determining result is 'Yes'), the processing unit 11 initializes the PCI-E interface card 16 by using the first initialization parameter (step S012). On the other hand, when the processing unit 11 determines that the flag does not have the first value, for example, the flag has the second value, the processing unit 11 initializes the PCI-E interface card 16 by using the second initialization parameter (step S013). Therefore, when the flag has a different value, the processing unit 11 may initialize, according to a different flag, the PCI-E interface card 16 by using a different initialization parameter.

In an embodiment, the processing unit 11 is preset, when performing step S01, to read the first initialization parameter from the BIOS memory 12 to a storage unit. Next, the processing unit 11 determines whether the flag has the first value. When the flag has the second value instead of the first value, the processing unit 11 reads the BIOS memory 12 to obtain the second initialization parameter and stores the second initialization parameter to the storage unit, so that the first initialization parameter is overwritten with the second initialization parameter. In this case, the processing unit 11 initializes one of the PCI-E interface cards 16, 17, or 18 by using the second initialization parameter in the storage unit. On the other hand, when the processing unit 11 determines that the flag has the first value after the first initialization parameter is stored in the storage unit, the processing unit 11 does not read the BIOS memory 12 to obtain the second initialization parameter, and the first initialization parameter still exists in the storage unit without being overwritten. In this case, the processing unit 11 initializes one of the PCI-E interface cards 16, 17, or 18 by using the first initialization parameter in the storage unit.

Further, the PCI-E interface card 16 is also used as an example. In step S02, the processing unit 11 may set the flag according to identification information of the PCI-E interface card 16. The identification information may be a manufacturer identification code or an apparatus identification code of the PCI-E interface card 16. In detail, the processing unit 11 determines, in step S02, whether the identification information of the PCI-E interface card 16 meets preset identification information (step S021). The preset identification information may be stored in the BIOS memory 12 and used as a part of the BIOS code. Before the electronic apparatus having the PCI-E interface is powered on, identification information of a PCI-E interface card that may be used in a poor PCI-E signal transmission environment can be prestored in the BIOS memory 12 as the preset identification information. When the processing unit 11 determines, in the boot procedure, that the identification information of the PCI-E interface card 16 meets the preset identification information, it indicates that a PCI-E signal transmission environment provided by the apparatus is poor. In this case, the PCI-E interface card 16 needs to be re-initialized by using the second initialization parameter. Then, the processing unit 11 may set the flag to correspond to the second initialization parameter, for example, set the flag to have the second value (step S022). On the other hand, when the processing unit 11 determines that the identification information of the PCI-E interface card 16 does not meet the preset identification information, it indicates that a PCI-E signal transmission environment provided by the apparatus is good. In this case, the PCI-E interface card 16 needs to be initialized by using the first initialization parameter. Therefore, the processing unit 11 may set the flag to correspond to the first initialization parameter, for example, set the flag to have the first value (step S023).

Further, after the flag is set, in order to determine whether the PCI-E interface card 16 needs to be reinitialized, in step S03, when the identification information of the PCI-E interface card 16 meets the preset identification information, the processing unit 11 needs to further determine whether a same PCI-E interface card is inserted in the PCI-E interface slot 13 in a previous boot procedure (step S031). That is, step S031 is performed to further determine whether the PCI-E interface card inserted in the PCI-E interface slot 13 is replaced. If the PCI-E interface card inserted in the PCI-E interface slot 13 is replaced, it indicates that the PCI-E interface card 16 is not inserted in the PCI-E interface slot 13 in the previous boot procedure. In step S01, the processing unit 11 does not initialize the PCI-E interface card 16 by using an appropriate initialization parameter according to an appropriate flag (that is, the processing unit 11 does not initialize the PCI-E interface card 16 by using the second initialization parameter according to the second value of the flag in step S011 of the boot procedure). That is, step S031 is used for repeated confirmation, to avoid a situation in which the PCI-E interface card 16 is replaced during two consecutive boots and is initialized by using an inappropriate initialization parameter. Therefore, when the identification information of the PCI-E interface card 16 meets the preset identification information (a determining result of step S021 is 'Yes'), the processing unit 11 needs to determine, by using step S031, whether the PCI-E interface card is replaced after the previous boot procedure. When a PCI-E interface card that is previously inserted is not the PCI-E interface card 16 and is different from the PCI-E interface card 16 (a determining result of step S031 is 'No'), it indicates that the PCI-E interface card inserted in the PCI-E interface slot 13 is replaced after the previous boot procedure. In this case, the processing unit 11 is reset (step S05), and reinitializes the PCI-E interface card 16 by using the second initialization parameter according to the second value of the flag after the processing unit 11 is reset (step S01).

In an embodiment, the processing unit 11 may obtain the identification information of the PCI-E interface card 16 after initializing the PCI-E interface card 16, and the processing unit 11 may store the identification information in a storage unit, to record the identification information of the PCI-E interface card 16 (step S024). In this case, when determining the identification information of the PCI-E interface card 16 and the preset identification information (step S021), the processing unit 11 may perform comparison according to the identification information stored in the storage unit. Further, the identification information stored in the storage unit is also used as basis for determining whether the same PCI-E interface card is inserted in the previous boot procedure (step S031). For example, assuming that the processing unit 11 stores identification information that is currently obtained into a first storage unit, the processing unit 11 may move the identification information from the first storage unit to a second storage unit after determining that the PCI-E interface card 16 needs to be reinitialized. The identification information in the second storage unit is used as identification information of the PCI-E interface card inserted in the PCI-E interface slot 13 in the previous boot procedure. Then, after the processing unit 11 is reset, the processing unit 11 may compare, in step S031 according to the identification information in the first storage unit and the second storage unit, whether identification information that is obtained in a current boot procedure is the same as the identification information that is obtained in the previous boot procedure, to determine whether the same PCI-E interface card is inserted in the previous boot procedure. In an embodiment, the first storage unit and the second storage unit may be different storage spaces in a same storage unit, or may be two independent storage units. The present invention is not limited thereto.

On the other hand, the PCI-E interface card 16 is also used as an example. When the processing unit 11 determines that the PCI-E interface card inserted in the PCI-E interface slot 13 in the previous boot procedure is the same as the PCI-E interface card 16 (the determining result of step S031 is 'Yes'), it indicates that the PCI-E interface card 16 is inserted in the PCI-E interface slot 13 in the previous boot procedure, and a user does not replace the PCI-E interface card 16 in the PCI-E interface slot 13 after the previous boot procedure. In this case, the processing unit 11 needs to further determine whether a system configuration of the electronic apparatus having the PCI-E interface is changed (step S032), to determine, by using step S032, whether the same PCI-E interface card still needs to be reinitialized because the system configuration is changed. When the system configuration is changed (a determining result of step S032 is 'Yes'), it indicates that the system configuration is changed after the previous boot procedure. However, the processing unit 11 does not initialize the PCI-E interface card 16 by using an appropriate initialization parameter according to an appropriate flag in the boot procedure (that is, does not initialize the PCI-E interface card 16 by using the second initialization parameter according to the second value of the flag in the boot procedure). In this case, the processing unit 11 is reset (step S05), and reinitializes the PCI-E interface card 16 according to the second value of the flag in step S01 after the processing unit 11 is reset. In an embodiment, the system configuration may be a stepping of the processing unit 11, a timing parameter of the processing unit 11, and/or a timing parameter of another riser card in the apparatus, and the like.

In an embodiment, the processing unit 11 also records the system configuration of the current boot procedure in step S024. That is, the processing unit 11 stores a system configuration that is currently obtained into a storage unit as basis for determining whether the system configuration is changed in step S032. For example, assuming that the processing unit 11 stores the system configuration that is currently obtained into a third storage unit, the processing unit 11 may move the system configuration from the third storage unit to a fourth storage unit after determining that the PCI-E interface card 16 needs to be reinitialized. The system configuration stored in the fourth storage unit is used as a system configuration corresponding to the previous boot procedure after the processing unit 11 is reset. Then, after the processing unit 11 is reset, the processing unit 11 may determine, according to the third storage unit and the fourth storage unit in step S032, whether the system configuration is changed. The third storage unit and the fourth storage unit may be different storage spaces in a same storage unit, or may be two independent storage units. In addition, the third storage unit and the fourth storage unit may be the same as or different from the first storage unit and the second storage unit. The present invention is not limited thereto.

In an embodiment, after the flag is set, the PCI-E interface card 16 is also used as an example. To determine whether the PCI-E interface card 16 needs to be reinitialized, in step S03, when the identification information of the PCI-E interface card 16 does not meet the preset identification information (the determining result of step S021 is 'No'), the processing unit 11 needs to further determine whether identification information of another PCI-E interface card inserted in the PCI-E interface slot 13 in the previous boot procedure meets the preset identification information included in the BIOS code (step S033). That is, step S033 is used to determine whether the flag has been set to have the first value in the previous boot procedure. When the identification information of the previously inserted PCI-E interface card does not meet the preset identification information (a determining result of step S033 is 'No'), it indicates that the flag has been set to have the first value in step S023 in the previous boot procedure. In step S01 in the boot procedure, the processing unit 11 has initialized the PCI-E interface card 16 by using the first initialization parameter according to the flag having the first value. Therefore, when the determining result of the processing unit in step S021 is 'No' and the determining result of S033 is 'No', it indicates that the PCI-E interface card 16 is not replaced and does not need to be reinitialized, so that the processing unit 11 continues executing the boot procedure (step S04) after determining that the identification information of the previously inserted PCI-E interface card does not meet the preset identification information.

However, when the identification information of the previously inserted PCI-E interface card meets the preset identification information (the determining result of step S033 is 'Yes'), it indicates that the processing unit 11 has set the flag to have the second value in step S02 in the previous boot procedure (the processing unit sets the flag to have the first value in step S02 in the boot procedure), and the processing unit 11 initializes the PCI-E interface card 16 by using the first initialization parameter in step S01 in the boot procedure. Therefore, the PCI-E interface card 16 needs to be reinitialized. In this case, the processing unit 11 returns to step S031. In step S031, the determining result that is obtained by performing step S021 is different from the determining result that is obtained by performing step S033, and it indicates that the previously inserted PCI-E interface card is different from the PCI-E interface card 16. Therefore, the processing unit 11 is reset (step S05) when determining that the previously inserted PCI-E interface card is different from the PCI-E interface card 16 in step S031. The processing unit 11 reinitializes the PCI-E interface card 16 by using the first initialization parameter according to the first value of the flag (step S01) after the processing unit is reset, so that the amount of attenuation of a PCI-E signal transmitted by the PCI-E interface card 16 is less than the preset attenuation value.

In conclusion, according to an embodiment of the method for initializing a PCI-E interface card of the present invention, a processing unit may select, in a boot procedure according to a flag, an initialization parameter that meets a PCI-E signal transmission environment to initialize the PCI-E interface card. When the processing unit selects an initialization parameter that does not meet the PCI-E signal transmission environment, the processing unit resets the flag and reinitializes the PCI-E interface card. Therefore, regardless of being in a good or poor PCI-E signal transmission environment, the amount of attenuation of a signal transmitted by the PCI-E interface card is less than a preset attenuation value, and production costs of an apparatus do not increase because a firmware is used for control.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for initializing a peripheral component interconnect express (PCI-E) interface card, applied to an electronic apparatus, and comprising:
   initializing a PCI-E interface card inserted in a PCI-E interface slot using a processing unit in a boot procedure according to a preset first value of a flag, by using a first initialization parameter comprised in a basic input/output system code (BIOS code);
   setting the flag, using the processing unit in the boot procedure according to the initialized PCI-E interface card, to have the preset first value or a second value;
   determining whether identification information of the initialized PCI-E interface card meets preset identification information comprised in the BIOS code using the processing unit in the boot procedure;
   when the identification information meets the preset identification information, determining whether another PCI-E interface card inserted in the PCI-E slot in another boot procedure of a previous boot is the same as the PCI-E interface card using the processing unit in order to determine whether the initializes PCI-E interface card needs to be reinitialized; and
   reinitializing the PCI-E interface card using the processing unit according to the second value of the set flag when the PCI-E interface card needs to be reinitialized, by using a second initialization parameter comprised in the BIOS code.

2. The method for initializing the PCI-E interface card according to claim 1, wherein initializing the PCI-E interface card by using the first initialization parameter comprises:
   determining, using the processing unit, whether the flag has the first value; and
   initializing the PCI-E interface card using the processing unit, when the flag has the first value, by using the first initialization parameter.

3. The method for initializing the PCI-E interface card according to claim 2, wherein reinitializing the PCI-E interface card using the processing unit, by using the second initialization parameter comprises:
   determining, using the processing unit, whether the flag has the first value; and
   reinitializing the PCI-E interface card using the processing unit, when the flag has the second value instead of the first value, by using the second initialization parameter.

4. The method for initializing the PCI-E interface card according to claim 1, wherein reinitializing the PCI-E interface card using the processing unit comprises:
   resetting the processing unit when the PCI-E interface card needs to be reinitialized; and
   initializing the PCI-E interface card using the processing unit, in another boot procedure after the processing unit is reset, by using the second initialization parameter.

5. The method for initializing the PCI-E interface card according to claim 1, wherein setting the flag comprises determining, using the processing unit, whether the identification information of the initialized PCI-E interface card meets the preset identification information comprised in the BIOS code, to set the flag.

6. The method for initializing the PCI-E interface card according to claim 5, wherein setting the flag further comprises:
   setting the flag to have the second value using the processing unit, when the identification information meets the preset identification information; and
   setting the flag to have the first value using the processing unit, when the identification information does not meet the preset identification information.

7. The method for initializing the PCI-E interface card according to claim 1, further comprising determining, using the processing unit, when the another PCI-E interface card is different from the PCI-E interface card, so that the PCI-E interface card needs to be reinitialized.

8. The method for initializing the PCI-E interface card according to claim 1, further comprising determining, using the processing unit, when the another PCI-E interface card is the same as the PCI-E interface card, whether a system configuration corresponding to the boot procedure is the same as another system configuration corresponding to the another boot procedure, to determine whether the PCI-E interface card needs to be reinitialized.

9. The method for initializing the PCI-E interface card according to claim 8, further comprising determining, using the processing unit, when the system configuration is different from the another system configuration, so that the PCI-E interface card needs to be reinitialized.

10. The method for initializing the PCI-E interface card according to claim 8, further comprising determining, using the processing unit, when the system configuration is the same as the another system configuration, so that the PCI-E interface card does not need to be reinitialized, and continuing to execute the boot procedure.

11. The method for initializing the PCI-E interface card according to claim 6, further comprising determining, using the processing unit, when identification information of the PCI-E interface card does not meet the preset identification information of the BIOS code, whether identification information of another PCI-E interface card inserted in the PCI-E slot in another boot procedure of a previous boot meets the preset identification information, to determine whether the PCI-E interface card needs to be reinitialized.

12. The method for initializing the PCI-E interface card according to claim 11, further comprising determining, using the processing unit, when the identification information of the another PCI-E interface card meets the preset identification information, whether the another PCI-E interface card inserted in the PCI-E slot in the another boot procedure of the previous boot is the same as the PCI-E interface card, to determine whether the PCI-E interface card needs to be reinitialized.

13. The method for initializing the PCI-E interface card according to claim 11, further comprising determining, using the processing unit when the identification information of the another PCI-E interface card does not meet the preset identification information, that the PCI-E interface card does not need to be reinitialized, and continuing executing the boot procedure.

14. The method for initializing the PCI-E interface card according to claim 12, further comprising determining, using the processing unit, when the another PCI-E interface card is different from the PCI-E interface card, that the PCI-E interface card needs to be reinitialized.

15. The method for initializing the PCI-E interface card according to claim 12, further comprising determining, using the processing unit, when the another PCI-E interface card is the same as the PCI-E interface card, whether a system configuration corresponding to the boot procedure is the same as another system configuration corresponding to the another boot procedure, to determine whether the PCI-E interface card needs to be reinitialized.

16. The method for initializing the PCI-E interface card according to claim 15, further comprising determining, using the processing unit, when the system configuration is different from the another system configuration, that the PCI-E interface card needs to be reinitialized.

17. The method for initializing the PCI-E interface card according to claim 15, further comprising determining, using the processing unit, when the system configuration is the same as the another system configuration, that the PCI-E interface card does not need to be reinitialized, and continuing executing the boot procedure.

18. The method for initializing the PCI-E interface card according to claim 1, wherein setting the flag, using the processing unit in the boot procedure according to the initialized PCI-E interface card, to have the first value or a second value comprises recording, using the processing unit, the identification information of the PCI-E interface card after the PCI-E interface card is initialized, and
wherein determining, using the processing unit, whether the initialized PCI-E interface card needs to be reinitialized comprises determining, suing the processing unit, according to the identification information, whether the initialized PCI-E interface card needs to be reinitialized.

* * * * *